United States Patent [19]

Matsui

[11] Patent Number: 4,513,172
[45] Date of Patent: Apr. 23, 1985

[54] CLAMP FIXING DEVICE

[75] Inventor: Kazuhiro Matsui, Toyoake, Japan

[73] Assignee: Kitagawa Industries Co., Ltd., Nagoya, Japan

[21] Appl. No.: 385,396

[22] PCT Filed: Sep. 9, 1981

[86] PCT No.: PCT/JP81/00228
§ 371 Date: May 20, 1982
§ 102(e) Date: May 20, 1982

[87] PCT Pub. No.: WO82/01296
PCT Pub. Date: Apr. 15, 1982

[30] Foreign Application Priority Data

Sep. 30, 1980 [JP] Japan ............................ 55-136323
May 20, 1981 [JP] Japan ............................ 56-72851[U]

[51] Int. Cl.³ ............................................ H02G 15/007
[52] U.S. Cl. ............................ 174/65 SS; 285/161; 411/14
[58] Field of Search ................ 174/65 R, 65 SS; 285/158, 161, 343, 356, 357, 353, 322; 411/305, 306, 301, 8, 14

[56] References Cited

U.S. PATENT DOCUMENTS 3,352,961 11/1967 Simon .................. 174/65 R
4,033,393 7/1977 Bedi .................... 411/301

FOREIGN PATENT DOCUMENTS 1765795 8/1971 Fed. Rep. of Germany ... 174/65 SS
1370028 7/1964 France ........................... 285/343
37-12754 6/1962 Japan .
53-67895 6/1978 Japan .
53-107195 8/1978 Japan .
449095 4/1968 Switzerland ................... 174/65 SS Primary Examiner—A. T. Grimley
Assistant Examiner—D. A. Tone
Attorney, Agent, or Firm—Oblon, Fisher, Spivak, McClelland & Maier

[57] ABSTRACT

A cable fixing device which is constructed by superposing between an outer housing (1) and an inner housing (7) both of which can be fitted with each other by screwing, a hanging bell-shaped packing (14) having an inner hole, a guiding ring (19) having a guiding hole, and a tightening ring (20) having a plurality of flexible fins (21) reclining in the inward direction, and which is adapted for clamping an inserted cable with the flexible fins (21) of the tightening ring (20) by resiliently contacting the hanging bell-shaped packing (14) with the outer periphery of said cable and screwing the inner housing (7) into the outer housing (1). By the water protecting effect of the hanging bell-shaped packing (14) and the fixing effect of the tightening ring, it can prevent the penetration of water from the outside and simultaneously can securely fix cables of various diameters without changing the parts.

8 Claims, 12 Drawing Figures

Fig. 10 (II)

CLAMP FIXING DEVICE

TECHNICAL FIELD

The present invention relates to a cable fixing device which, on taking out a cable already wired on a body of an appliance, a switch box etc., fixes such a cable to the body of the appliance, the switch box etc.

BACKGROUND ART

The cable fixing device of this type is employed when inserting a cable through a plate material etc. so as to protect the cover of the cable against damage by the plate material of a chassis of a switch box etc. and at the same time to fix the cable and the plate material firmly, and also it is used in a switch box etc. together with a packing inserted into a housing thereof so as to prevent penetration of rain water etc. through a cable inserting hole.

Therefore, characteristics required of the cable fixing device of this type include that the cable can be firmly fixed, that the fixed cable will not become loose even after it has been repeatedly bent in a mechanical manner, that the fixed part has waterproofness and prevents rain water etc. from penetrating into the inside of e.g. a switch box etc. to which the cable has been installed, that the same cable fixing device can be widely applied to various kinds of cables having different outer diameters, that fixing of the cable can be effected by a simple operation, and so forth. Nevertheless, the conventional cable fixing devices have drawbacks and thus fail to meet the above described characteristics required of the cable fixing devices, for example, some, although they can clamp cables firmly and can withstand repeated, mechanical bending of the cable, have disadvantages that they suffer from poor waterproofness and that they are not widely applicable to cables having different outer diameters because fixing of the cable is given priority in construction; some have a complicated construction in order to enhance fixing of the cable and waterproofness and therefore have a disadvantages that the operation to install a cable is troublesome; some are only applicable to cables having a predetermined outer diameter and whenever they are to be applied to cables having a diameter other than the above, some of the parts have to be replaced, and so forth.

DISCLOSURE OF THE INVENTION

The present invention is a cable fixing device which has eliminated the various drawbacks inherent to the above described conventional cable fixing devices by superposing between an outer housing and an inner housing both of which can be fitted with each other by screwing, a hanging bell-shaped packing, a guiding ring having a guiding hole, and a tightening ring having a plurality of flexible fins, screwing said both housings together to clamp the cable with the tightening ring, thereby fixing said cable and at the same time resiliently contacting the hanging bell-shaped packing with the cable, thereby improving waterproofness.

BRIEF DESCRIPTION OF THE DRAWING

FIG. 1 through FIG. 3 show a first embodiment of the present invention, in which FIG. 1 is a vertical cross-sectional view, FIG. 2 is a perspective view showing dissembled parts, and FIG. 3 is a vertical cross-sectional view explaining the function;

FIGS. 10(I) and 10(II) are plan views showing pertinent parts of an eighth embodiment.

BEST MODE OF CARRYING OUT THE INVENTION

Figure 1:
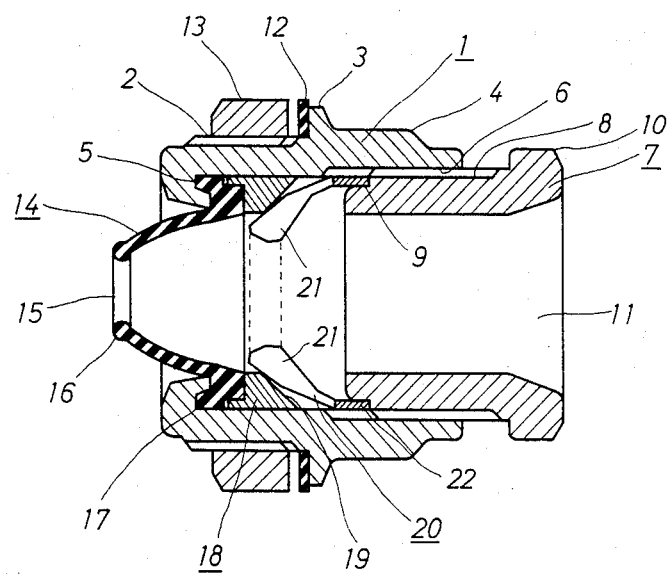
Figure 2:
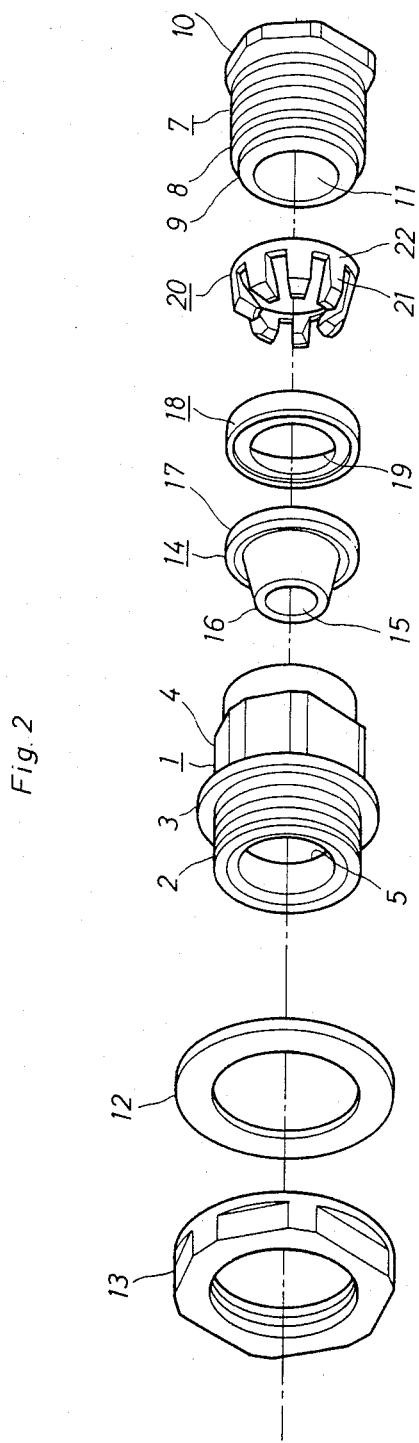
Figure 3:
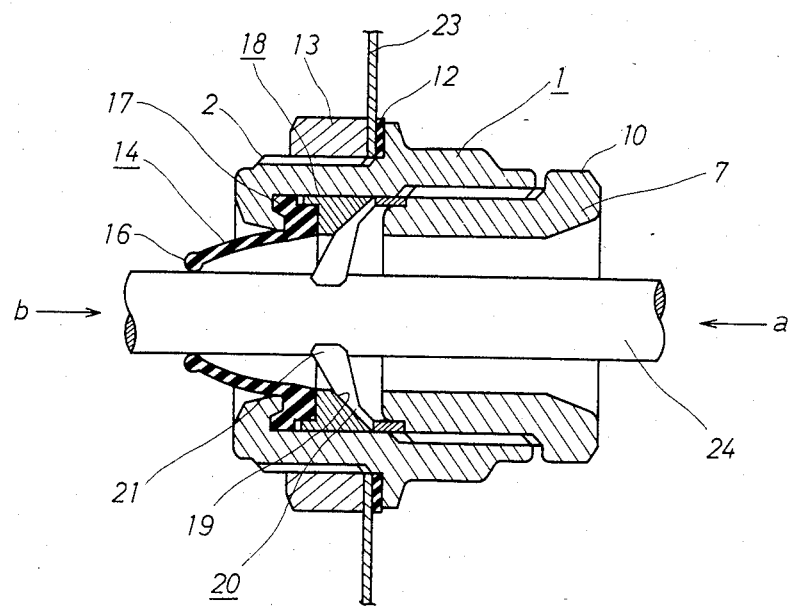

FIG. 1 through FIG. 3 show the first embodiment of the present invention, in which (1) is an outer housing, which has a male screw part (2), a flange part (3) and a hexagonal part (4) formed integrally on its outer periphery, and on its inner periphery there are formed a channel (5) for inserting a packing and a female screw part (6) so that a male screw part (8) of an inner housing (7) can be screwed into said female screw part (6); said inner housing (7) has a dent part (9) provided at the tip of said male screw part (8) on its periphery, a hexagonal part (10) provided at the end thereof and an inner hole (11). (12) is a flat packing, and (13) is a hexagonal nut, both of which are to be fixed onto the male screw part (2) of said outer housing (1). (14) is a hanging bell-shaped packing made of a flexible material such as synthetic rubber etc., the tip part (16) of which has an inner hole (15) and is of somewhat greater thickness than the other part, while a flange part (17) having a larger diameter is inserted into the channel (5) for inserting a packing and said tip part (16) is fitted so as to protrude from the left end of the outer housing (1). (18) is a guiding ring having a conical hole (19) as a guiding hole, and is inserted into the outer housing (1) at a position adjacent to the flange part (17) having a larger diameter of said hanging bell-shaped packing (14). (20) is a tightening ring having a plurality of flexible fins (21) reclining in the inward direction and formed on its periphery, and it is inserted into the outer housing (1) in such direction that the outer reclining surfaces of the flexible fins (21) reclining in the inward direction be in contact with the conical hole (19) of said guiding ring (18), and at the same time an annular part (22) is inserted and positioned in the dent part (9) of said inner housing (7).

In FIG. 1, the state where the cable is not inserted is shown, and therefore the inner housing (7) is not fully screwed in the outer housing (1) yet, there is a space between the tightening ring (20) and the guiding ring (18), and the flexible fins (21) of the tightening ring (20) are adequately stretching. In this state, as shown in FIG. 3, after the cable fixing device itself has been fixed to e.g. a switch box etc. by inserting the male screw part (2) of the outer housing (1) into an installation part (23) of such a switch box and tightening with the flange part (3) and the hexagonal nut (13) via the flat packing (12), the cable (24) is then inserted into the cable fixing device from the direction indicated by the arrow a shown in the figure, at which time, as described above, the flexible fins (21) of the tightening ring (20) are in the opened state so that the cable can be smoothly inserted and when the inner housing (7) is screwed into the outer housing (1) by pinching the hexagonal part (10) thereof with a spanner etc., the inner housing (7) enters the inside of the outer housing (1) and at the same time the tightening ring (20) advances inward, and the flexible fins (21) are brought into contact with the conical hole (19) and bent inward by being led by this conical wall, thereby the tips of the flexible fins (21) bite into the outer periphery of the cable (24) to firmly fix the cable (24). At the same time, the thicker tip part (16) of the hanging bell-shaped packing (14) is resiliently contacted with the outer periphery of the cable (24) and further the flange part (17) having a larger diameter of the hanging bell-shaped packing (14) is pressed upon the channel (5) for inserting a packing of the outer housing (1) by being pressed down by the guiding ring (18) by entering of the inner housing (7), thereby the space between the cable (24) and the hanging bell-shaped packing (14) and that between the outer housing (1) and the hanging bell-shaped packing (14) are closely sealed to enhance waterproofness.

Further, while the cable (24) fixed by the tightening ring (20) has reasonable resistance to withdrawal in both directions indicated by the arrows a and b shown in the figure, the shape of the flexible fins (21) particularly strengthens the resistance to withdrawal in the direction indicated by the arrow b shown in the figure, and furthermore by adjusting the degree of tightening of the inner housing (7) against the outer housing (1), the cable (24) can be firmly fixed even when it has a different diameter, and also resulting from the structural nature of the hanging bell-shaped packing (14), this is widely applicable to cables having different diameters. In addition, even when the cable (24) is repeatedly bent against the cable fixing device at its fixed part, stable cable fixing is secured without adversely affecting fixing of the cable (24) or its waterproofness owing to resiliency of the flexible fins (21) of the tightening ring (20) and the structural nature of the thinner part of the hanging bell-shaped packing (14).

However, even with the above-described cable fixing device, when fitting a cable to the cable fixing device, the smaller diameter tip part of the hanging bell-shaped packing receives an expanding force from the outer periphery of the cable, and this force can sometimes dislocate the hanging bell-shaped packing from the normal position, and if the cable fixing device is used under such conditions, the hanging bell-shaped packing will surely fail to exhibit an adequate waterproofing effect.

Figure 4:
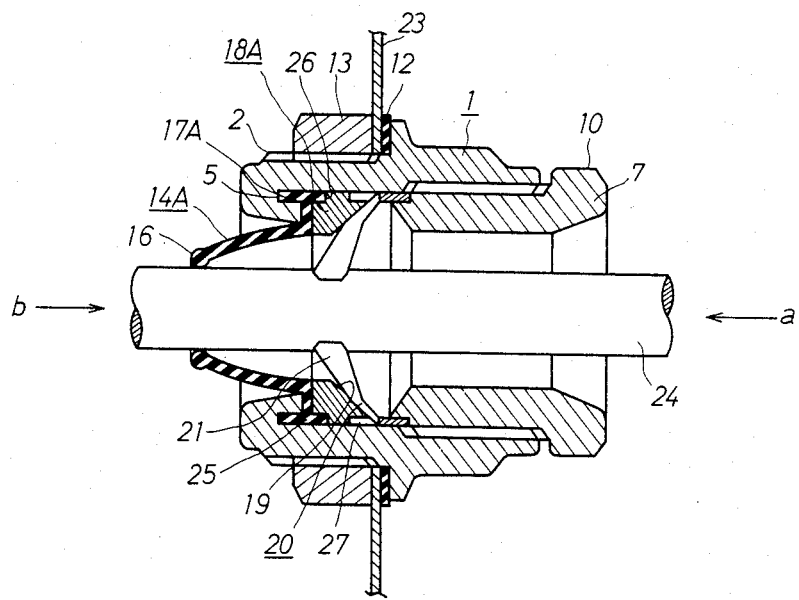
FIG. 4 is a vertical cross-sectional view of a second embodiment.

That which has improved this point is shown in FIG. 4 as the second embodiment.

Figure 5:
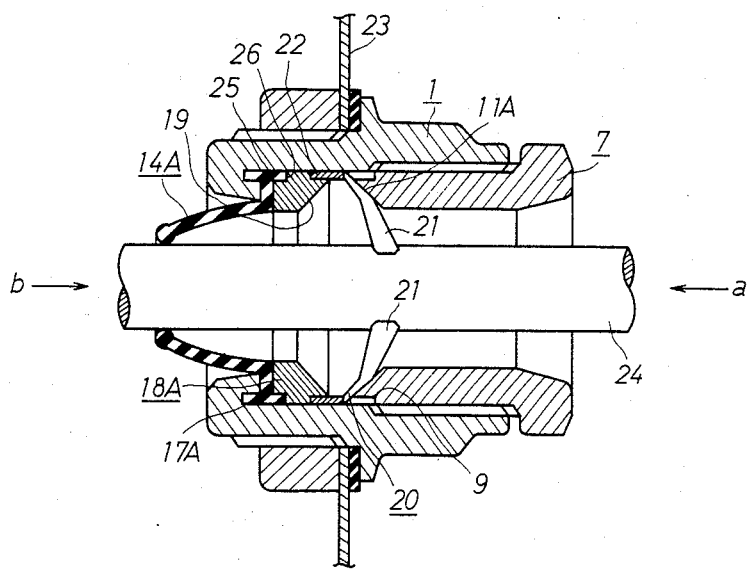
FIG. 5 is a vertical cross-sectional view of a third embodiment.

In FIG. 4, (14A) is a hanging bell-shaped packing of this embodiment, and it has a protruded fringe (25) integrally formed on the periphery of the end face of the larger diameter flange part (17A). (18A) is a guiding ring, and it has a recessed fringe (26) around the outer periphery so that the above protruded fringe (25) is seated against this recessed fringe, and also a dent part (27) into which an annular part (22) of a tightening ring (20) described later with reference to FIG. 5 is inserted. The remaining numerals correspond to those represented by the same numerals as described above for FIG. 1 through FIG. 3.

When inserting the cable (24), the hanging bell-shaped packing (14A) receives a force in the direction in which the thicker tip end (16) thereof expands as described above, but the larger diameter flange part (17A) is securely fixed and held by the channel (5) for inserting a packing of the outer housing (1) and the recessed fringe (26) of the guiding ring (18A), and therefore the hanging bell-shaped packing (14A) is not dislocated from the normal position at the time of inserting the cable (24). Therefore, the hanging bell-shaped packing (14A) is maintained in good contact with the outer housing (1), thus adequately preventing rain water etc. from penetrating through said contact part.

FIG. 5 shows the third embodiment of the present invention, and while in the above-described second embodiment the guiding ring (18A) is seated adjacent to the larger diameter flange part (17A) of the hanging bell-shaped packing (14A) and the tightening ring (20) is inserted into the dent part (9) of the inner housing (7), so that the conical hole (19) of the guiding ring (18A) and the flexible fins (21) of the tightening ring (20) are seated opposite to each other, this embodiment is of a construction in which the annular part (22) of the tightening ring (20) is inserted into a dent part (27) of the guiding ring (18A). According to this embodiment, the contact condition between the hanging bell-shaped packing (14A) and the outer housing (1) may be held satisfactorily and at the same time the resistance to withdrawal in the direction indicated as the arrow a may be strengthened. Further, since an inclined surface is provided on the inner end face (11A) of the inner hole (11) of the inner housing (7), the inner end face (11A) can act to guide the tightening ring (20).

Figure 6:
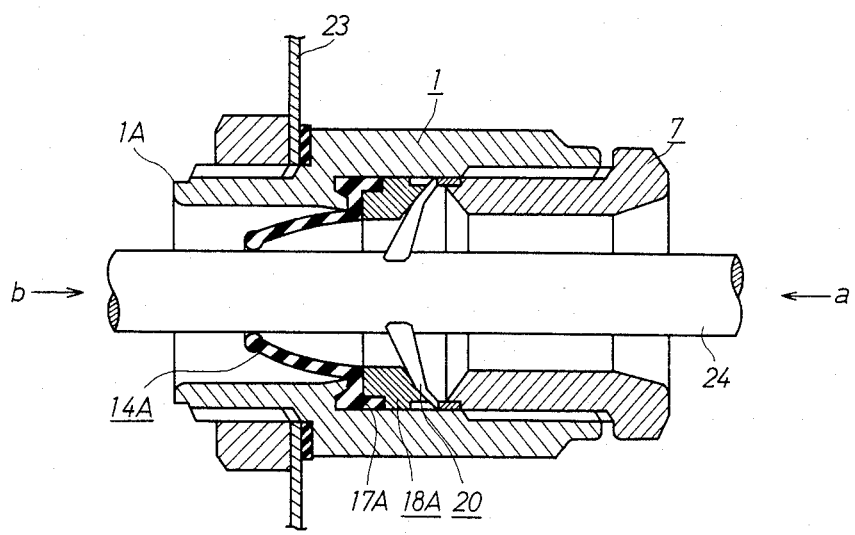
FIG. 6 is a vertical cross-sectional view of a fourth embodiment.

FIG. 6 shows the fourth embodiment of this invention which exhibits functions and effects similar to those in the above-described first embodiment except that in this case a cover part (1A) is provided on the outer housing (1) so as to cover the tip part (16) of the hanging bell-shaped packing (14A) and that the position of a plate material (23) of a switch box etc. is shifted so that the left protruding part of the cable fixing device from said plate material is minimized as shown in the figure, and this embodiment also has similar functions and effects as in the above-described second embodiment.

Figure 7:
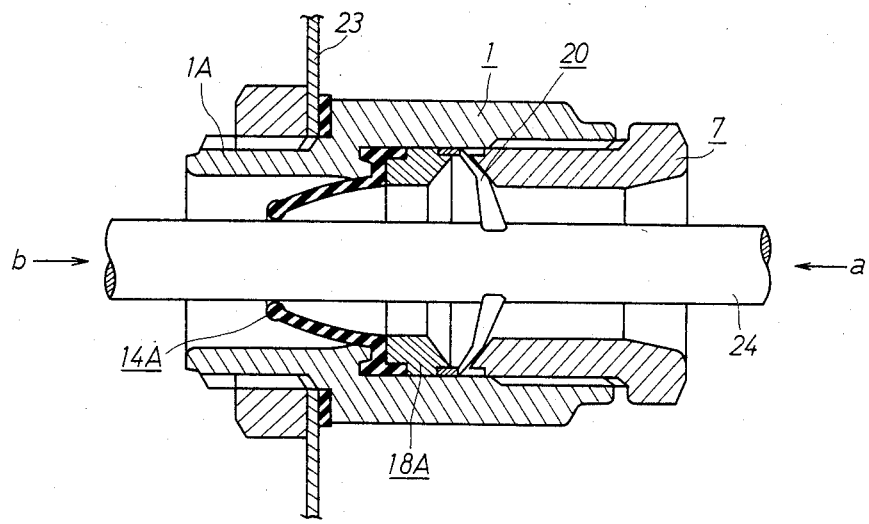
FIG. 7 is a vertical cross-sectional view of a fifth embodiment.

FIG. 7 shows the fifth embodiment of the present invention which exhibits functions and effects similar to those in the fourth embodiment, except that the direction of the tightening ring (20) is changed from that in the fourth embodiment, just as the case where the direction of the tightening ring (20) of the third embodiment is changed from that in the second embodiment.

Figure 8:
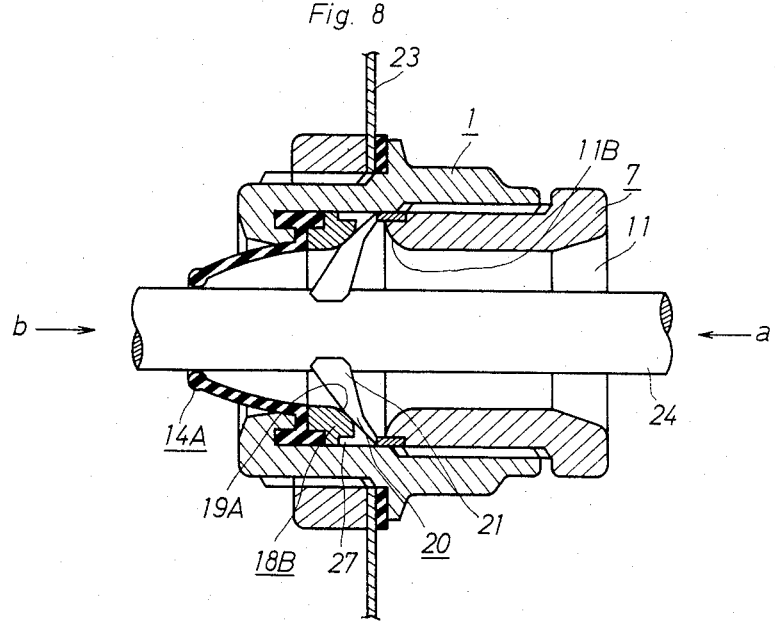
FIG. 8 is a vertical cross-sectional view of a sixth embodiment.

FIG. 8 shows the sixth embodiment of the present invention which exhibits functions and effects similar to those in the above-described second embodiment, except that in this case a guiding hole (19A) of a guiding ring (18B) has a cross-section of a circular arc, that said circular arc surface is faced against the flexible fins (21) of the tightening ring (20), further that the inner end surface (11B) of the inner hole (11) of the inner housing (7) is of a cross-section of a circular arc similarly as with the guiding hole (19A) of the guiding ring (18B), and therefore by such construction in this embodiment, the sliding surface between the guiding ring (18B) and the flexible fins (21) is in linear contact when screwing the inner housing (7) into the outer housing (1) and the tightening the flexible fins (21) of the tightening ring (20) onto the periphery of the cable (24) using the guiding ring (18B), thereby the clamping operation can be effected more easily and abrasion of the outer wall surface of the flexible fins (21) is lessened. Further, also in this embodiment, an adequate waterproofing effect is obtained.

Figure 9:
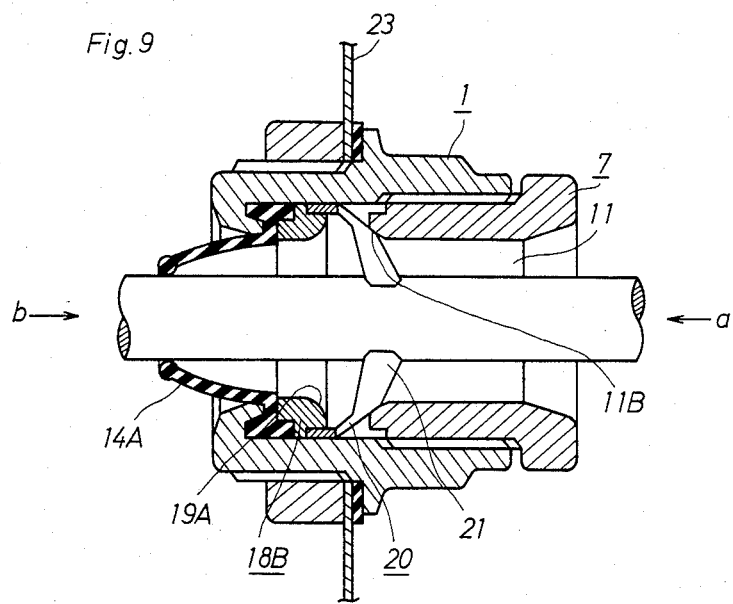
FIG. 9 is a vertical cross-sectional view of a seventh embodiment.

FIG. 9 shows the seventh embodiment of the present invention, in which similarly as in the case where the direction of the tightening ring (20) of the third embodiment is changed from that in the second embodiment, the direction of the tightening ring (20) is changed from that in the sixth embodiment.

Figure 10:
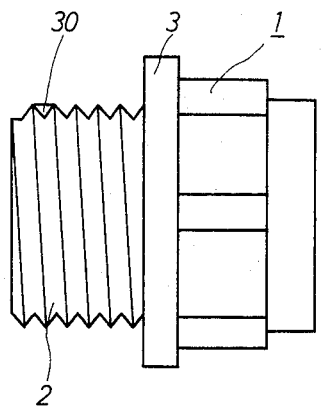

FIGS. 10(I) and 10(II) show the eighth embodiment of the present invention, in which the male screw part (2) of the flange part (3) of the cable fixing device is provided with a protrusion (30) having a height more or less the same as that of the thread depth at some position in the second groove from the advancing end as shown in FIG. 10(I). Similarly, the male screw part (8) of the inner housing (7) is also provided with a protrusion (31) as shown in FIG. 10(II).

By providing the protrusions (30) and (31) as above, for assemblying the cable fixing device of this embodiment, on screwing the hexagonal nut (13) into the flange part (3) via the flat packing (12), while this hexagonal nut (13) is being rotated from about ½ to about 2 times, the first thread part of the female screw part hits the protrusion (30) to give a considerable shock to the operator, and if he wants to further screw it, he has to exert a force enough to crush the protrusion (30) and continue screwing. Even after the protrusion (30) has been crushed, since the male screw part and the female screw part are in tight contact by the crushed and hence deformed protrusion (30) still remaining as a debris in the groove, somewhat stronger force is necessary to screw in than in the case where there is no protrusion (30).

Therefore, this embodiment has eliminated the adverse influences resulting from fully tightening the screw, that is, a disadvantage that if the respective screw parts are tightened to the maximum degree, even if they are screwed manually, the resulting clamping force is considerably strong and the inside flexible fins (21) extremely deform to bring about a creeping phenomenon, and as a result, said fins (21) exhibit plastic deformation and never return to the original form, and therefore insertion of a cable is difficult and the part is merely disposed as a failed part, and a disadvantage that workability is reduced because the operator cannot easily tighten such a screw manually.

Figure 11:
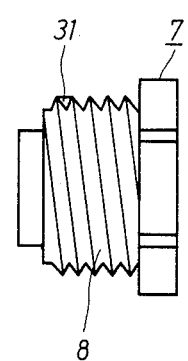
FIG. 11 is a plan view showing pertinent parts of of a ninth embodiment.
Figure 11:
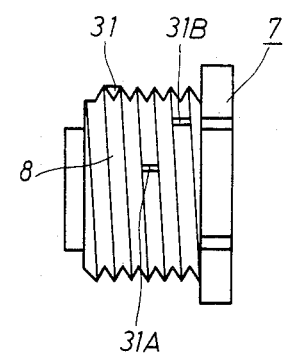

FIG. 11 shows the ninth embodiment of the present invention, in which the male screw part (8) of the inner housing (7) is provided with protrusions (31), (31A) and (31B) at three positions in the grooves.

In this embodiment, for inserting a cable and screwing in the inner housing (7) to fix the cable, since the operator can feel the hitting whenever the first flight part of the female screw part of the outer housing (1) hits the protrusions (31), (31A) and (31B), he can avoid unnecessary excessive screwing of the inner housing (7) by knowing the number of hitting. Further, based on this, by providing a protrusion at a position most suitable to stop screwing according to the outer diameter of the cable to be used, the operator can readily detect the most suitable degree of screwing.

It should be noted that the case where a protrusion or protrusions are provided on the male screw part has been illustrated in the above-described eighth and ninth embodiments, but they can be provided on the hexagonal nut (13) and/or the female screw part (6) of the outer housing (1).

INDUSTRIAL APPLICABILITY

As has been described above, the present invention is a cable fixing device constructed by superposing between an outer housing and an inner housing both of which can be fitted with each other by screwing, a hanging bell-shaped packing having an inner hole, a guiding ring having a guiding hole, and a tightening ring having a plurality of flexible fins reclining in the inward direction, and adapted for clamping an inserted cable with the flexible fins of the tightening ring by resiliently contacting the hanging bell-shaped packing with the outer periphery of said cable and screwing the inner housing into the outer housing, it has an advantage that the cable can be extremely firmly fixed by this and at the same time such fixing is not loosened even after the thus fixed cable is repeatedly bent in a mechanical manner, further it can maintain waterproofness high between the cable and the packing and between the packing and the housing, still further, since the flexible fins of the tightening ring are adapted for biting into the cable merely by screwing the inner housing into the outer housing and the packing is formed in a hanging bell shape, it may be widely applied to various kinds of cables having different diameters.

Accordingly, the cable fixing device of the present invention is extremely excellent as the fixing device for wiring in various appliances, especially as the fixing device for wiring cables having various diameters and requiring high waterproofness.

I claim:

1. A cable fixing device comprising:
   (a) an outer housing having an internal bore which is larger in diameter than the external diameter of any cable to be received in said cable fixing device;
   (b) an inner housing having an internal bore which is larger in diameter than the external diameter of any cable to be received in said cable fixing device, said inner housing being threadedly received in said outer housing;
   (c) a hanging bell-shaped packing mounted in the internal bore of said outer housing, said hanging bell-shaped packing having an axial hole sized and shaped to fit snugly around the periphery of a cable during use of said cable fixing device;
   (d) a guiding ring slidably received in the internal bore of said outer housing and positioned to bear against said hanging bell-shaped packing, said guiding ring having an axial guiding hole which is larger in diameter than the external diameter of any cable to be received in said cable fixing device and an axial camming surface on the end remote from said hanging bell-shaped packing;
   (e) one of said hanging bell-shaped packing and said guiding ring having an axially protruding annular flange and the other of said hanging bell-shaped packing and said guiding ring having a corresponding annular recess sized, shaped, and positioned so as to receive said protruding annular flange, whereby said guiding ring fixes and holds said hanging bell-shaped packing; and
   (f) a tightening ring slidably received in the internal bore of said outer housing, said tightening ring having a plurality of inwardly extending flexible fins sized and shaped to grip firmly the periphery of a cable during use of said cable fixing device, said tightening ring being positioned between said guiding ring and the axially inner end of said inner housing with the outer surface of said plurality of flexible fins bearing against the camming surface on said guiding ring and the axially inner end of said inner housing bearing against the end of said tightening ring remote from said guiding ring, whereby, during use of said cable fixing device to clamp a cable, telescopic motion of said outer and inner housings relative to each other forces said tightening ring to slide axially in the internal bore of said outer housing, and the axial movement of said tightening ring causes the flexible fins on said tightening ring to be cammed inwardly by the axial camming surface on said guiding ring until the flexible fins firmly grip the periphery of the cable being clamped by said cable fixing device.

2. A cable fixing device as recited in claim 1 wherein:
 (a) the axial camming surface of said guiding ring is the inner periphery of the axial guiding hole in said guiding ring;
 (b) the axial guiding hole is a conical hole which narrows in diameter in the direction away from said tightening ring; and
 (c) the flexible fins on said tightening ring are cammed inwardly by contact with the conical hole.

3. A cable fixing device as recited in claim 1 in which at least one protrusion is provided in the threaded engagement between said outer housing and said inner housing for use in detecting the relative positions of said outer and inner housings.

4. A cable fixing device as recited in claim 3 wherein a plurality of protrusions are provided in the threaded engagement between said outer and inner housings for use in detecting the relative positions of said outer and inner housings.

5. A cable fixing device comprising:
 (a) an outer housing having an internal bore which is larger in diameter than the external diameter of any cable to be received in said cable fixing device;
 (b) an inner housing having an internal bore which is larger in diameter than the external diameter of any cable to be received in said cable fixing device, said inner housing being threadedly received in said outer housing and the axially inner portion of the internal bore in said inner housing having a circular cross-section of variable diameter;
 (c) a hanging bell-shaped packing mounted in the internal bore of said outer housing, said hanging bell-shaped packing having an axial hole sized and shaped to fit snugly around the periphery of a cable during use of said cable fixing device;
 (d) a guiding ring slidably received in the internal bore of said outer housing and positioned to bear against said hanging bell-shaped packing, said guiding ring having an axial guiding hole which is larger in diameter than the external diameter of any cable to be received in said cable fixing device and an axial camming surface on the end remote from said hanging bell-shaped packing, the axial camming surface on said guiding ring having a circular cross-section of variable diameter;
 (e) one of said hanging bell-shaped packing and said guiding ring having an axially protruding annular flange and the other of said hanging bell-shaped packing and said guiding ring having a corresponding annular recess sized, shaped, and positioned so as to receive said protruding annular flange, whereby said guiding ring fixes and holds said hanging bell-shaped packing; and
 (f) a tightening ring slidably received in the internal bore of said outer housing, said tightening ring having a plurality of inwardly extending flexible fins sized and shaped to grip firmly the periphery of a cable during use of said cable fixing device, said tightening ring being positioned between said guiding ring and the axially inner end of said inner housing, the flexible fins on said tightening ring being adapted to be cammed inwardly by contact with either the axial camming surface on said guiding ring or the axially inner portion of the internal bore in said inner housing, depending on which way said tightening ring is oriented, whereby, during use of said cable fixing device to clamp a cable, telescopic motion of said outer and inner housings relative to each other forces said tightening ring to slide axially in the internal bore of said outer housing, and the axial movement of said tightening ring causes the flexible fins on said tightening ring to be cammed inwardly until the flexible fins firmly grip the periphery of the cable being clamped by said cable fixing device.

6. A cable fixing device as recited in claim 5 wherein said first and second axial camming surfaces are both conical in shape with diameters which narrow in the directions away from said tightening ring.

7. A cable fixing device as recited in claim 5 in which at least one protrusion is provided in the threaded engagement between said outer housing and said inner housing for use in detecting the relative positions of said outer and inner housings.

8. A cable fixing device as recited in claim 7 wherein a plurality of protrusions are provided in the threaded engagement between said outer and inner housings for use in detecting the relative positions of said outer and inner housings.

* * * * *